(12) United States Patent
Chen et al.

(10) Patent No.: US 7,802,374 B1
(45) Date of Patent: Sep. 28, 2010

(54) CAPACITIVE DIGITAL CALIPER

(76) Inventors: Qiliang Chen, Room 602, Block 1, Long District, Shenzhen 518054 (CN); Shaoguang Chen, 7/F, Block 5, Nan You 4th Industry Zone, Nanshan Road, Shenzhen 518054 (CN); Haiping Liu, 7/F, Block 5, Nan You 4th Industry Zone, Nanshan Road, Shenzhen 518054 (CN); Yongzhong Kang, 7/F, Block 5, Nan You 4th Industry Zone, Nanshan Road, Shenzhen 518054 (CN); Meiying Chen, 7/F, Block 5, Nan You 4th Industry Zone, Nanshan Road, Shenzhen 518054 (CN)

( * ) Notice: Subject to any disclaimer, the term of this patent is extended or adjusted under 35 U.S.C. 154(b) by 0 days.

(21) Appl. No.: 09/744,165

(22) PCT Filed: Jul. 20, 1999

(86) PCT No.: PCT/CN99/00094
§ 371 (c)(1),
(2), (4) Date: Mar. 26, 2001

(87) PCT Pub. No.: WO00/05547
PCT Pub. Date: Feb. 3, 2000

(30) Foreign Application Priority Data
Jul. 21, 1998 (CN) ................. 98 1 16518

(51) Int. Cl.
*G01B 3/24* (2006.01)
*G01B 7/02* (2006.01)

(52) U.S. Cl. .................... 33/784
(58) Field of Classification Search ............ 33/705, 33/706, 707, 783, 784, 810, 811, 812
See application file for complete search history.

(56) References Cited

U.S. PATENT DOCUMENTS

| | | | | |
|---|---|---|---|---|
| 3,945,121 | A * | 3/1976 | Uchino ................ | 33/784 |
| 4,612,656 | A * | 9/1986 | Suzuki et al. ........... | 33/784 |
| 6,260,286 | B1 * | 7/2001 | Suzuki et al. ........... | 33/813 |
| 6,279,248 | B1 * | 8/2001 | Walters ................ | 33/784 |
| 2003/0217478 | A1 * | 11/2003 | Matsumiya et al. ...... | 33/784 |
| 2005/0081400 | A1 * | 4/2005 | Matsumiya et al. ...... | 33/706 |
| 2008/0250665 | A1 * | 10/2008 | Hayashida et al. ....... | 33/825 |
| 2009/0119940 | A1 * | 5/2009 | Meichle et al. ......... | 33/708 |
| 2009/0282689 | A1 * | 11/2009 | Hayashida et al. ....... | 33/819 |
| 2010/0024237 | A1 * | 2/2010 | Hayashida et al. ....... | 33/831 |

* cited by examiner

*Primary Examiner*—G. Bradley Bennett
(74) *Attorney, Agent, or Firm*—McDonnell Boehnen Hulbert & Berghoff LLP

(57) ABSTRACT

A capacitive digital caliper comprises a main beam and a slider, a rack and a gear are mounted on the main beam and the slider respectively. This gear system changes the linear position x on the main beam into angular position($\theta+2N\pi$), and the angular position is measured by a capacitive measuring device. The capacitive measuring device of angular position is seally isolated from the rack and gear by a seal cavity and a seal member. Therefore, the caliper can be used under a poor condition at present of particulate and fluid contaminants. The present invention is particularly suitable for being used in the field of mechanical work.

13 Claims, 2 Drawing Sheets

CAPACITIVE DIGITAL CALIPER

FIELD OF THE INVENTION

The present invention relates to a digital caliper, particularly to a capacitive digital caliper to be used under various conditions, especially those having pollutants such as oil, water and dust etc.

BACKGROUND OF THE INVENTION

The digital calipers fabricated by the principle of capacitive position sensing, with the advantages of high resolution, easy reading etc., have been widely applied, while the main drawback is that it should be used under purer environmental circumstances. Because there is an air gap between the electrodes of a capacitive position sensor and capacitance varies, when pollutants like oil, water, and dust etc. with dielectric constants differing from air are intruded into the air gap, resulted in the reliability and accuracy of the value measured will be affected. But in the working place of the machinery industry, the existence of the pollutants like cutting oil, cooling water and dust etc. are inevitable, which resulted in unreliable working of capacitive digital calipers. Accordingly, their spreading and application are largely restricted.

In order to overcome the drawbacks of capacitive position sensor which is sensitive to the pollutants, various solutions have been proposed in the prior art. For example, in U.S. Pat. No. 5,172,485 Gerhard et al proposed a non-air-gap method by setting the sliding contact of the upper, lower support members of electrodes of the capacitive position sensor. Theoretically speaking, there were no pollutants can be intruded, since no air gap existed between the two electrodes. However, unless sliding contact was frictionless, insulation protecting layers of the electrodes shall be worn by sliding contact. The electrode contact surfaces must be extremely flat and smooth to meet the requirements of no air gap and also no friction, which were rather difficult to be reached. Even if the requirements could be achieved in fabrication, air gaps can also be formed partly between the electrodes due to expansion and contraction by heat and cold, stress deformation and abrasion etc. As long as a local air gap exists, abrasion shall be aggravated by dust intrusion and the air gap will be increasingly expanded. Consequently, as a matter of fact, the problem in sensitivity of the capacitive position sensor to pollutants still cannot be solved by the sliding contact method. In China Patent CN1114412A, Andermo proposed a method of covering the electrodes with a thicker dielectric layer for reducing sensitivity of capacitive position sensor to the pollutants, it decreased the capacitive reactance change rate of the sensor caused by pollutant intruded into the air gap and weakened over one half of sensitivity of the capacitive position sensor to the pollutants. However, the above-mentioned problem was still not yet perfectly solved. The reliability and accuracy of the value measured can still be affected by the pollutants intruded. Another method was disclosed by Andermo et al in China Patent CN1147084A, it comprised an electrostatic capacitive slide caliper adopting an entirely sealed capacitive position sensor to prevent pollutants from intruding. Since the electrode length of linear position sensor on the main beam must not be shorter than the range of the caliper and the shorter electrode on the slider should move correspondingly to the longer electrode, the sealing of capacitive position sensor was a quite difficult problem of long-range motive seal. The method of Andermo et al was to place both the longer and the shorter electrodes in an enclosed cavity, compressed the shorter mobile electrode on the longer fixed electrode fastened to the main beam by a clip spring and bring the mobile electrode plate to slide on the fixed electrode plate by a rod connected to the slider via a through-hole on the sealed cavity. As for the method, rigidity of the connecting rod of the slider and mobile electrode plate was only required along the axial direction of the slider movement, while free bending in other directions is allowed, so as to prevent the capacitive position sensor from damaging due to over pressure loaded on the electrode plate. This is a nearly unreachable requirement since no material at present is of unidirectional rigidity and also free-bending property along other directions. The axial length will certainly change in a certain extent when the bending deformation of the material takes place. In the three embodiments of this patent, an elastic component 172, a bending component 672 or a clip spring 772 were respectively connected to the position between the mobile electrode plate and the rigid rod fastened on the slider. The application of these resilient components was solely intended for realizing the cushion purpose of flexure to avoid overpressure on other parts, whereas axial rigidity of the connecting rod was not really guaranteed because of the fact that as long as the rod displacement perpendicular to axial direction surpasses 0.1 mm, its length variation along the axial direction of slider will exceed 0.01 mm. This length variation changed randomly according to user mode, which causes mismatching of one-to-one correspondence between the positions of slider and the mobile electrode of the sensor. So measurement errors shall be resulted in and the caliper accuracy cannot be guaranteed. The spreading and application of the method disclosed in the said patent was also restricted due to the such problems as wear-prone property of electrodes, non-removable electromagnetic interference due to over long detection electrode, and difficulties in production due to complicated structure etc.

SUMMARY OF THE INVENTION

An object of the present invention is to overcome the deficiency of current method in the prior art, to provide a really effective method of solving the sensitive problem of capacitive position sensor to the pollutants, and provide a capacitive digital caliper with facilitated reliable operation under the condition with the existence of pollutants like oil, water, and dust etc.

To achieve the above purpose, the present capacitive digital caliper used for measuring inside or outside dimensions of the measured object comprising a main beam with jaws on its end portion; and a slider sliding along the length of the main beam, having jaws on its end portion matching with those of the main beam, provided with a measuring display device comprising a measuring display and a measuring circuit board, wherein, a rack is provided along the length of the main beam, and is suitable for the range of the main beam;

the slider is provided with a gear system comprising at least a pinion and its shaft, engaged with the rack; and a sealed cavity making use of a wall fastened to the outside of the measuring circuit board, is provided with a stator plate of the first electrode forming a certain pattern fastened on the measuring circuit board and electrically coupled with the measuring circuit; and a rotor plate of the second electrode forming a certain pattern concentrically opposed at a distance to the first electrode set, and fastened onto the shaft of the gear system, which penetrates through a motive sealing member on the cavity wall, and connected to the gear system outside the cavity.

A capacitive digital caliper according to the present invention, wherein the indexing of the rack is installed in parallel with the sliding direction of measurement.

A capacitive digital caliper according to the present invention, wherein the first and second electrode sets mutually opposed is circular-grid-shaped.

A capacitive digital caliper according to the present invention, wherein the rotor plate is disc-shaped.

A capacitive digital caliper according to the present invention, wherein the slipped position of the slider on the main beam is a function of rotational angular position of the rotor plate and the circles turned over.

A capacitive digital caliper according to the present invention, wherein the rack and the pinion as well as the sealed cavity connected with the rack and pinion can be installed on the front face of the caliper.

A capacitive digital caliper according to the present invention, wherein the rack and the pinion as well as the sealed cavity connected with the rack and pinion can be installed on the back face of the caliper.

The present capacitive digital caliper used for measuring the inside and outside dimensions of the measured object comprising
 a main beam with jaws on its end portion; and
 a slider sliding along the length of the main beam, having jaws on its end portion matching with those of the main beam, provided with a measuring display device comprising a measuring display and a measuring circuit board, wherein,
 a rack is provided along the length of the main beam, and is suitable for the range of the beam;
 the slider is provided with
 a gear system comprising at least a pinion and its shaft, engaged with the rack; and
 a sealed cavity, which is provided with
 a measuring display device fastened on top of the cavity;
 a stator plate of the first electrode forming a certain pattern, fastened on the measuring circuit board, and electrically coupled with the measuring circuit;
 a rotor plate of the second electrode forming a certain pattern concentrically opposed at a distance to the first electrode set, and fastened onto the shaft of the gear system, which penetrates through a motive sealing member on the cavity, and connected to the gear system outside the cavity.

A capacitive digital caliper according to the present invention, wherein the indexing of the rack is installed in parallel with the sliding direction of measurement.

A capacitive digital caliper according to claim 8, wherein the first and second electrode sets mutually opposed is circular-grid-shaped.

A capacitive digital caliper according to claim 8, wherein the rotor plate is disc-shaped.

A capacitive digital caliper according to claim 8, wherein the slipped position of the slider on the main beam is a function of rotational angular position of the rotor plate and the circles turned over.

A capacitive digital caliper according to the present invention, wherein the rack and the pinion as well as the sealed cavity connected with the rack and pinion can be installed on the front face of the caliper.

A capacitive digital caliper according to the present invention, wherein the rack and the pinion as well as the sealed cavity connected with the rack and pinion can be installed on the back face of the caliper.

The capacitive digital caliper used for measuring inside and outside dimensions of the measured object comprising
 a main beam having jaws on its end portion; and
 a slider sliding along the length of the main beam, having jaws on its end portion matching with those of the main beam, provided with a measuring display device comprising a measuring display and a measuring circuit board which are defined in a distance, wherein:
 a rack is provided along the length of the main beam, and is suitable for the range of the main beam;
 the slider is provided with
 a gear system comprising at least a pinion and its shaft, engaged with the rack; and
 a sealed cavity provided with
 a measuring display device fastened on top of the cavity;
 a stator plate of the first electrode forming a certain pattern fastened on the measuring circuit board and electrically coupled with the measuring circuit;
 a rotor plate of the second electrode forming a certain pattern concentrically opposed at a distance to the first electrode set, and the second electrode set being installed between the spaced measuring display and measuring circuit board, and fastened onto the gear system, which penetrates through the stator plate fastened on the measuring board and a motive sealing on the cavity, connected to the gear system outside the cavity.

A capacitive digital caliper according to the present invention, wherein the indexing of the rack is installed in parallel with the sliding direction of measurement.

A capacitive digital caliper according to the present invention, wherein the first and second electrode sets mutually opposed is circular-grid-shaped.

A capacitive digital caliper according to the present invention, wherein the rotor plate is disc-shaped.

A capacitive digital caliper according to the present invention, wherein the slipped position of the slider on the main beam is a function of rotational angular position of the rotor plate and the circles turned over.

A capacitive digital caliper according to the present invention, wherein the rack and the pinion as well as the sealed cavity connected with the rack and pinion can be installed on the front face of the caliper.

A capacitive digital caliper according to the present invention, wherein the rack and the pinion as well as the sealed cavity connected with the rack and pinion can be installed on the back face of the caliper.

The sealing members in the capacitive digital caliper of the present invention may be axial seals like radial circular "O" shaped rubber rings or axial thrust bearings.

In summary, main idea of the technical solution of the present invention is that since the parts of capacitive position sensor in the caliper are sensitive to the contaminants like oil, water, dust etc, and not the mechanical parts like the rule in the caliper etc, in order to avoid the problem of long range motive sealing in, a facilitated sealed capacitive angular position sensor is used in stead of the linear capacitive position sensor, therefore a rack-and-pinion device for transforming linear displacement to angular displacement is introduced into the caliper, then the capacitive angular position sensor and the caliper mechanical parts like rack and gears etc are isolated in motive sealing by axial seals, thereby a facilitated capacitive digital caliper performing reliable operation at the presence of contaminants like oil, water and dust etc shall be provided.

BRIEF DESCRIPTION OF THE DRAWINGS

With reference to the following drawings, the preferred embodiments of the present invention shall be illustrated in detail.

DESCRIPTION OF THE PREFERRED EMBODIMENTS

Figure 1B:
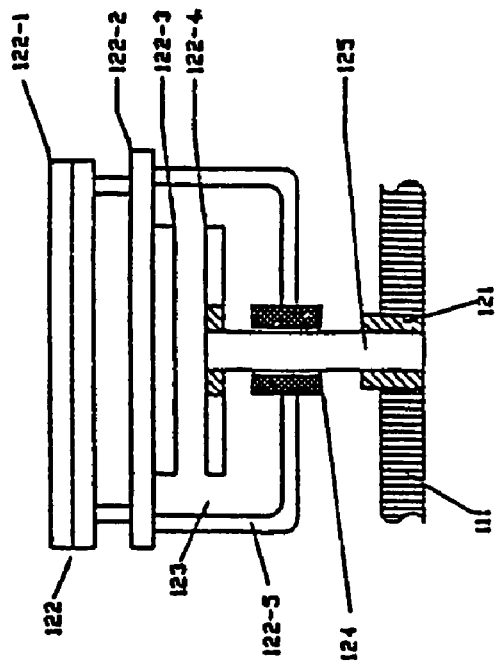
FIG. 1B is a cross section view along A-A line in FIG. 1A.
Figure 1A:
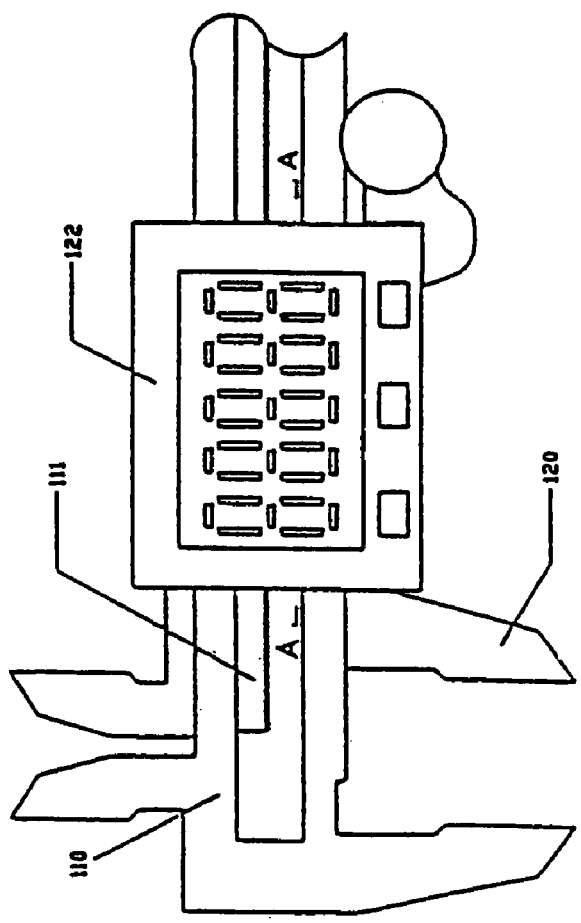
FIG. 1A is an over-all structure schematic of a capacitive digital caliper in the present invention.

An embodiment of the present invention is shown in FIG. 1 in which a rack 111 is mounted on main beam 110, the rack 111 should be suited for the range of main beam 111, i.e. shall be no less than the range of main beam 110, moreover, in the process of assembling the main beam, indexing of the rack should be in parallel with the sliding direction of caliper measurement. Pinion 121 engaged with the rack 111 and a measuring device 122 for making capacitive grid angular position measurement are installed in the slider 120. Coupling relationship of rack 111, pinion 121 and measuring device 121 for making capacitive grid angular position measurement is shown in the A-A cross section view. The measuring device 122 for making capacitive grid angular position measurement comprises a LCD display 122-1, an integrated circuit and a measuring circuit board 122-2 formed by a printed circuit board, a stator plate 122-3 including a circular-grid-shaped electrode and a disc-shaped rotor plate 122-4 with a circular-grid-shaped electrode. LCD display 122-1, measuring circuit board 122-2 and stator plate 122-3 are mechanically and electrically merged as a whole and fastened on slider 120. The base of measuring circuit board 122-2 is bound with cavity wall 122-5 to form a sealed cavity 123, which enables stator plate 122-3 and rotor plate 122-4 to be sealed within the cavity. Circular-grid-shaped electrodes on the stator plate and rotor plate are concentrically configured face-to-face, and a gap being retained for forming capacitor pairs to become a capacitive grid angular position sensor. A central hole of disc-shaped rotor plate 122-4 is mounted on a shaft 125 of pinion 121. The shaft 125 penetrates through a sealed bearing 124 on the sealed cavity wall 122-5 to realize motive sealing of the shaft, and pinion 121 is brought to movement following the slider by the contact driving force of sealed bearing. As the slider 120 slides on the track of main beam 110, the measuring device 122 on the slider and pinion 121 are followed in movement. Since pinion 121 is engaged with the rack 111, the rotation of the pinion 121 has to be followed during the movement of the slider and the angular position of rotor plate 122-4 corresponding to the stator plate 122-3 is led to displacement. Gapless meshing is realized between pinion 121 and rack 111 by employing a simple spring tightening method, single-valued correspondence of the position X of slider 120 on main beam 110 and the angular position ($\theta+2N\pi$) of rotor plate 122-4 relative to stator plate 122-3 is guaranteed, i.e.

$$X = K(\theta + 2N\pi) \quad \text{eq.1}$$

In which $\theta$ represents an angular position in rotation of shaft 125, N represents the circles turned over by the shaft 125, while K is a constant determined by the gear system structure solely formed by one or multiple gears, and is irrelevant with the positions of the rack-and-pinion system installed on main beam, slider i.e. The rack 111 and pinion 121 can be installed on the front face of caliper, which is the face having a display, and may also be mounted on the back face of caliper.

Figure 2:
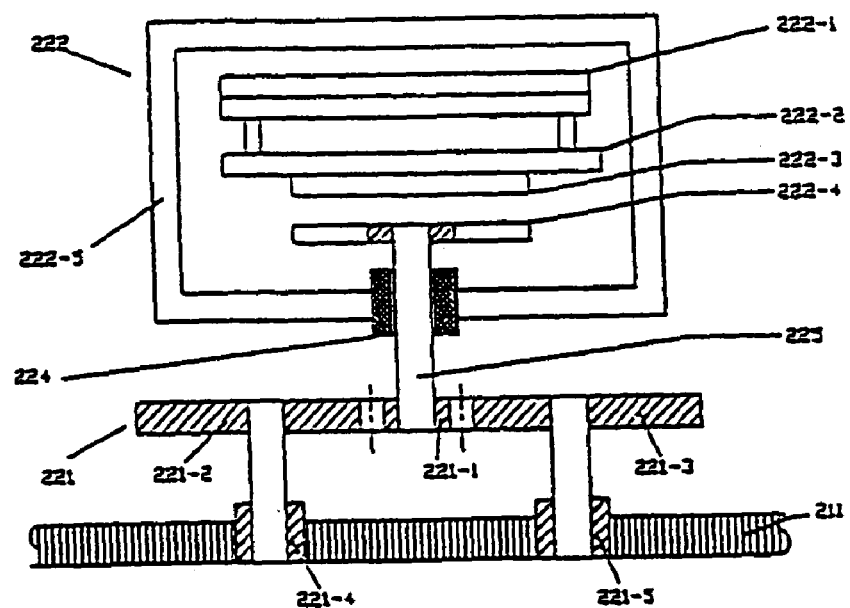
FIG. 2 is a schematic showing coupling relationship between a rack-and-pinion system and a measuring device for making capacitive grid angular position measurement in another embodiment of the present invention.

A second embodiment of the invention is as shown in FIG. 2, for simplicity an over-all structural view of the caliper is omitted, only a cross section view of coupling relationship of rack 211, gear system 221 and measuring device 222 for making capacitive grid angular position measurement have been provided. The measuring device 222 comprises a LCD display 222-1, a measuring circuit board 222-2 formed by an integrated circuit and a printed circuit board, a stator plate 222-3 having a circular-grid-shaped electrode, and a disc-shaped rotor plate 222-4 having a circular-grid-shaped electrode. LCD display 222-1, measuring circuit board 222-2 and stator plate 222-3 are mechanically and electrically merged into a whole, together with a sealed cavity wall 222-5, to be fastened onto the slider. The only difference between embodiment 1 and embodiment 2 is that in embodiment two, not only the stator plate and rotor plate are comprised in the sealed cavity, but also the measuring circuit board and display are involved. A central hole of disc-shaped rotor plate 222-4 is mounted onto shaft 225, shaft 225 passed through a sealed bearing 224 on the sealed cavity wall 222-5 to realize motive sealing of the shaft, the lower end of shaft 225 is mounted into a central hole of central pinion 221-1 of gear system 221, and the shaft bearings of five gears in the gear system 221 are also mounted on the slider, which enable the gear system to move follow the slider. Circular-grid-shaped electrodes on the stator plate and rotor plate are concentrically configured face-to-face and a gap is retained to form capacitor pairs to become the capacitive grid angular position sensor. As the slider sliding on the track of main beam, the measuring device 222 on the slider and gear system 221 are followed in movement, since gear system 221 is engaged with the rack 211 fastened on the main beam, gear system 221 and rotor plate 222-4 connected to the central pinion 221-1 all rotate following the movement of rack 211, and the angular position of rotor plate 222-4 relative to stator plate 222-3 is brought to change consequently. A conventional gapless coupling technology of double-drive-chain pinion-and-rack is employed to make a type of engagement equivalent to gapless meshing between the central pinion 221-1 and rack 211 so the single-valued correspondence of position X of slider on the main beam and the angular position ($\theta+2N\pi$) of rotor plate 222-4 relative to stator plate 222-3 is guaranteed.

Figure 3:
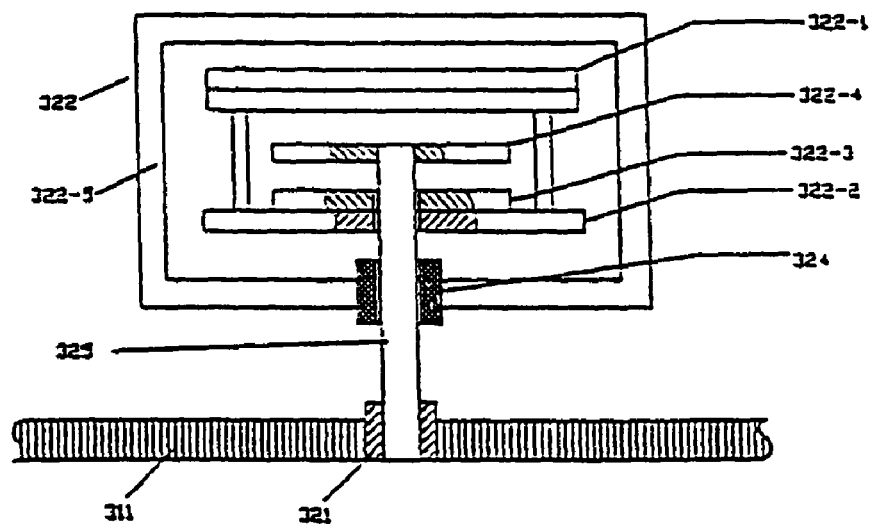
FIG. 3 is a schematic showing coupling relationship between a rack-and-pinion system and a measuring device for making capacitive grid angular position measurement of further embodiment in the present invention.

The third embodiment of the invention is as shown in FIG. 3, similar to embodiment 1, it is also a simple spring tightening single pinion system, the difference is that not only the rotor plate 322-4 and stator plate 322-3 of capacitive grid angular position sensor are involved in the sealed cavity 322-5, but also the LCD display 322-1 and the measuring circuit board 322-2 are comprised, and the upper, lower positions of the stator plate and rotor plate have been interchanged, from a configuration of the rotor plate under the stator plate changed to that of the rotor plate beyond the stator plate.

INDUSTRIAL APPLICABILITY

In comparison with prior art, the invention has the following advantages:

1. When the capacitive linear position sensor is transformed to the capacitive angular position sensor to be sealed, it has the advantages of small sealing volume, reliable axial motive sealing etc. A fabricated caliper can not only be used in the environment at present of the pollutants like oil, water and dust etc, but can also carry out measurement for submergence in liquid, as long as the main beam, slider and rack, gears of the caliper are made from rust-resisting material, then it can with stand long-term usage in water.

2. Simplified in structure and easily exploited, in addition, a same type of capacitive angular position sensor can be applied in calipers with various specifications and range, and being facilitated in intensive industrial production.

3. An angular position measuring device is formed by sealing the capacitive angular position sensor and a measuring display device in a cavity serving as an independent device of measurement display, it has only one shaft reaching out of the sealed cavity via an axial seal, the shaft being connected to a caliper with a rack-and-pinion to be a digital caliper. When its shaft is directly installed onto the shafts of rotating components of various machinery devices, then the instruments for measuring and indicating rotational positions and linear positions can be formed. If it is mounted onto a leading screw of machine tool, then it can serve as a position display in replacement of slide rule.

What is claimed is:

1. A capacitive digital caliper used for measuring inside or outside dimensions of the measured object comprising
   a main beam with jaws on its end portion; and
   a slider sliding along the length of said main beam, having jaws on its end portion matching with those of said main beam, provided with a measuring display device comprising a measuring display and a measuring circuit board, wherein,
   a rack is provided along the length of said main beam, and is suitable for the range of said main beam;
   said slider is provided with a gear system comprising at least a pinion and its shaft, engaged with said rack; and
   a sealed cavity is provided with
      a stator plate of a first electrode forming a certain pattern fastened on said slider and electrically coupled with said measuring circuit; and
      a rotor plate of a second electrode forming a certain pattern concentrically opposed at a distance to said first electrode set, and fastened onto said shaft of said gear system, which penetrates through a motive sealing member on said cavity wall, and connected to said gear system outside said cavity.

2. A capacitive digital caliper according to claim 1, wherein the indexing of said rack is installed in parallel with the sliding direction of measurement.

3. A capacitive digital caliper according to claim 1, wherein said first and second electrode sets mutually opposed is circular-grid-shaped.

4. A capacitive digital caliper according to claim 3, wherein said rotor plate is disc-shaped.

5. A capacitive digital caliper according to claim 1, wherein the slipped position of said slider on said main beam is a function of rotational angular position of said rotor plate and the circles turned over.

6. A capacitive digital caliper according to claim 1, wherein said rack and said pinion as well as said sealed cavity connected with said rack and pinion can be installed on the front face of said caliper.

7. A capacitive digital caliper according to claim 1, wherein said rack and said pinion as well as said sealed cavity connected with said rack and pinion can be installed on the back face of said caliper.

8. A capacitive digital caliper according to claim 1, wherein said measuring display device is provided outside said sealed cavity.

9. A capacitive digital caliper according to claim 8, wherein said measuring circuit board of said measuring display device is formed to a wall of said sealed cavity.

10. A capacitive digital caliper according to claim 1, wherein said measuring display device is confined within said sealed cavity.

11. A capacitive digital caliper according to claim 1, wherein said stator plate is fastened on the bottom of said measuring circuit board.

12. A capacitive digital caliper according to claim 1, wherein said stator plate is fasten on the top of said measuring circuit board.

13. A capacitive digital caliper according to claim 12, wherein said rotor plate is provided between said measuring display and said measuring circuit board via said shaft penetrates through said stator plate.

* * * * *